(12) United States Patent
Sharma et al.

(10) Patent No.: US 10,005,012 B2
(45) Date of Patent: Jun. 26, 2018

(54) INTERLOCK DEVICE

(71) Applicant: Donaldson Company, Inc., Minneapolis, MN (US)

(72) Inventors: Piyush Sharma, Valencia, CA (US); Sergio L. Vargas De Avila, North Hills, CA (US); Bernard S. Cohen, West Hills, CA (US)

(73) Assignee: Donaldson Company, Inc., Minneapolis, MN (US)

( * ) Notice: Subject to any disclaimer, the term of this patent is extended or adjusted under 35 U.S.C. 154(b) by 1057 days.

(21) Appl. No.: 14/296,546

(22) Filed: Jun. 5, 2014

(65) Prior Publication Data

US 2014/0360929 A1 Dec. 11, 2014

Related U.S. Application Data

(60) Provisional application No. 61/831,933, filed on Jun. 6, 2013.

(51) Int. Cl.
*B01D 35/30* (2006.01)
*B01D 35/157* (2006.01)
*B01D 27/08* (2006.01)

(52) U.S. Cl.
CPC ......... *B01D 35/1573* (2013.01); *B01D 27/08* (2013.01); *B01D 35/306* (2013.01);
(Continued)

(58) Field of Classification Search
None
See application file for complete search history.

(56) References Cited

U.S. PATENT DOCUMENTS 2,748,948 A 6/1956 Fricke et al.
4,806,240 A 2/1989 Giordano et al.
(Continued)

FOREIGN PATENT DOCUMENTS

DE 4201041 7/1993
EP 0681094 11/1995
(Continued)

OTHER PUBLICATIONS

"Communication Pursuant to Rules 161(1) and 162 EPC," for European Patent Application No. 14738934.0 dated Jan. 26, 2016 (2 pages).
(Continued)

*Primary Examiner* — Thomas M Lithgow
(74) *Attorney, Agent, or Firm* — Pauly, DeVries Smith & Deffner LLC (57) ABSTRACT

A filter receptacle assembly is described including a filter receptacle having a receptacle wall and a circular edge defining an opening for receiving a filter cartridge and a first interlock device coupled to the receptacle wall of the filter receptacle, wherein the first interlock device comprises a first actuator moveable between a first position and a second position and biased into the first position, wherein at least a portion of the first actuator protrudes from the receptacle wall in the first position, wherein the first interlock device is configured so that when a filter cartridge is inserted into the filter receptacle, the first actuator is moved by the filter cartridge from the first position to the second position and is held in the second position by the filter cartridge.

18 Claims, 9 Drawing Sheets

(52) U.S. Cl.
CPC .... *B01D 2201/303* (2013.01); *B01D 2201/40* (2013.01); *B01D 2201/4046* (2013.01)

(56) References Cited

U.S. PATENT DOCUMENTS

| | | | |
|---|---|---|---|
| 5,098,559 A | 3/1992 | Mack et al. |
| 5,516,425 A | 5/1996 | Brieden et al. |
| 5,643,446 A | 7/1997 | Clausen et al. |
| 5,681,461 A | 10/1997 | Gullett et al. |
| 5,695,633 A | 12/1997 | Ernst et al. |
| 5,695,636 A | 12/1997 | Gullett |
| 5,753,120 A | 5/1998 | Clausen et al. |
| 5,762,788 A | 6/1998 | Gullett et al. |
| 5,770,054 A | 6/1998 | Ardes |
| 5,770,065 A | 6/1998 | Popoff et al. |
| 5,814,215 A | 9/1998 | Bruss et al. |
| 5,846,416 A | 12/1998 | Gullett |
| 5,855,780 A | 1/1999 | Dye et al. |
| 5,888,384 A | 3/1999 | Wiederhold et al. |
| 5,902,479 A | 5/1999 | Fukumori et al. |
| 6,015,492 A | 1/2000 | Popoff et al. |
| 6,016,923 A | 1/2000 | Baumann |
| 6,053,334 A | 4/2000 | Popoff et al. |
| 6,113,781 A | 9/2000 | Popoff et al. |
| 6,139,738 A | 10/2000 | Maxwell |
| 6,171,491 B1 | 1/2001 | Popoff et al. |
| 6,177,003 B1 | 1/2001 | Jainek et al. |
| 6,217,763 B1 | 4/2001 | Lawrence et al. |
| 6,235,194 B1 | 5/2001 | Jousset et al. |
| 6,251,273 B1 | 6/2001 | Jawurek et al. |
| 6,383,244 B1 | 5/2002 | Wake et al. |
| 6,485,637 B2 | 11/2002 | Jainek et al. |
| 6,488,845 B1 | 12/2002 | Neufeld et al. |
| 6,495,042 B1 | 12/2002 | Knight et al. |
| 6,506,303 B1 | 1/2003 | Gustafsson et al. |
| 6,537,444 B2 | 3/2003 | Wilberscheid et al. |
| 6,543,625 B1 | 4/2003 | Le et al. |
| 6,554,139 B1 | 4/2003 | Maxwell et al. |
| 6,569,326 B1 | 5/2003 | Baumann et al. |
| 6,572,768 B1 | 6/2003 | Cline et al. |
| 6,607,665 B2 | 8/2003 | Fick et al. |
| 6,635,175 B2 | 10/2003 | Stankowski et al. |
| 6,679,990 B2 | 1/2004 | Reinhart et al. |
| 6,685,829 B1 | 2/2004 | Baumann et al. |
| 6,709,588 B2 | 3/2004 | Pavlin et al. |
| 6,752,924 B2 | 6/2004 | Gustafson et al. |
| 6,770,196 B2 | 8/2004 | Wall et al. |
| 6,790,356 B2 | 9/2004 | Wright et al. |
| 6,797,168 B1 | 9/2004 | Knight et al. |
| 6,811,694 B2 | 11/2004 | Jainek et al. |
| 6,814,243 B2 | 11/2004 | Amstutz et al. |
| 6,837,993 B2 | 1/2005 | Clausen et al. |
| 6,872,304 B1 | 3/2005 | Gebert et al. |
| 6,896,803 B2 | 5/2005 | Neufeld et al. |
| 6,921,479 B2 | 7/2005 | Ardes et al. |
| 6,926,156 B2 | 8/2005 | Wall et al. |
| 6,926,825 B2 | 8/2005 | Ardes et al. |
| 6,936,161 B2 | 8/2005 | Wright et al. |
| 6,949,182 B2 | 9/2005 | Yano et al. |
| 6,983,851 B2 | 1/2006 | Maxwell et al. |
| 6,986,426 B2 | 1/2006 | Clausen et al. |
| 6,994,796 B2 | 2/2006 | Wall et al. |
| 7,033,502 B2 | 4/2006 | Engelhard et al. |
| 7,086,537 B2 | 8/2006 | Maxwell et al. |
| 7,163,623 B2 | 1/2007 | Knight et al. |
| 7,204,370 B2 | 4/2007 | Clausen et al. |
| 7,326,342 B2 | 2/2008 | Richmond et al. |
| 7,360,658 B2 | 4/2008 | Clausen et al. |
| 7,390,407 B2 | 6/2008 | Weindorf et al. |
| 7,862,717 B2 | 1/2011 | Pfitzer et al. |
| 8,128,817 B2 | 3/2012 | Roesgen et al. |
| 8,999,163 B2 | 4/2015 | Honermann et al. |
| 9,352,257 B2 | 5/2016 | Sharma |
| 2002/0170279 A1 | 11/2002 | Gustafson et al. |
| 2004/0159600 A1 | 8/2004 | Stankowski et al. |
| 2004/0182777 A1 | 9/2004 | Stankowski et al. |
| 2005/0035053 A1 | 2/2005 | Engelhard et al. |
| 2005/0178714 A1 | 8/2005 | Stockbower et al. |
| 2006/0006124 A1 | 1/2006 | Yates et al. |
| 2006/0054547 A1 | 3/2006 | Richmond et al. |
| 2007/0039864 A1 | 2/2007 | Dworatzek et al. |
| 2007/0215561 A1 | 9/2007 | Yates et al. |
| 2007/0267338 A1 | 11/2007 | Menez et al. |
| 2008/0053884 A1 | 3/2008 | Marshall et al. |
| 2008/0169233 A1 | 7/2008 | Pfitzer et al. |
| 2008/0245719 A1 | 10/2008 | Beard et al. |
| 2009/0236271 A1 | 9/2009 | Eserkaln et al. |
| 2010/0044295 A1 | 2/2010 | Honermann et al. |
| 2010/0089813 A1 | 4/2010 | Tellier et al. |
| 2010/0155321 A1 | 6/2010 | Sasur et al. |
| 2011/0100893 A1* | 5/2011 | Kocksch ................ B01D 35/30 210/236 |
| 2011/0303600 A1 | 12/2011 | Honermann et al. |
| 2013/0193057 A1 | 8/2013 | Honermann et al. |
| 2014/0360929 A1 | 12/2014 | Vargas De Avila et al. |

FOREIGN PATENT DOCUMENTS

| | | |
|---|---|---|
| EP | 1008375 | 6/2000 |
| EP | 1031367 | 8/2000 |
| EP | 1110590 | 6/2001 |
| EP | 1419809 | 5/2004 |
| EP | 1623749 | 2/2006 |
| EP | 1714688 | 10/2006 |
| EP | 2091626 | 12/2011 |
| GB | 615250 | 1/1949 |
| JP | 2003320206 | 11/2003 |
| WO | 0009238 | 2/2000 |
| WO | 02070869 | 9/2002 |
| WO | 03080215 | 10/2003 |
| WO | 2004069373 | 8/2004 |
| WO | 2005087346 | 9/2005 |
| WO | 2008134494 | 11/2008 |
| WO | 2009132291 | 10/2009 |
| WO | 2011056857 | 5/2011 |
| WO | 2014197796 | 12/2014 |

OTHER PUBLICATIONS

"International Preliminary Report on Patentability," for PCT/US2014/041305 dated Dec. 17, 2015 (8 pages).

"Non-Final Office Action," for U.S. Appl. No. 13/755,938 dated Jul. 23, 2015 (17 pages).

"Extended EP Search Report," for European Application No. 11190932.1, dated Jun. 1, 2012 (5 pages).

"International Search Report and Written Opinion," For PCT Application No. PT/US2014/041305, dated Dec. 11, 2014 (10 pages).

"Reservoir Fill, Filter Manifold Assembly," Western Filter Corp. 1987, 1 page.

* cited by examiner

INTERLOCK DEVICE

This application claims the benefit of U.S. Provisional Application No. 61/831,933, filed Jun. 6, 2013, the contents of which are herein incorporated by reference.

FIELD OF THE TECHNOLOGY

This disclosure relates to filtration assemblies and methods. In particular, this disclosure relates to an interlock device for a filtration assembly.

BACKGROUND

Filters are commonly used in connection with lubrication systems and fuel systems for internal combustion engines, and hydraulic systems for heavy-duty equipment. Filters are also used in many other types of liquid systems. In these types of systems, the filter is changed periodically. In the art, there are at least two standard types of filters used. One type is a spin-on canister filter, while the other is a bowl-cartridge filter.

Bowl-cartridge filters typically include a reusable bowl holding a replaceable filter element (filter cartridge). Bowl-cartridge filters are sometimes preferred instead of spin-on canister filters due to disposal or other issues. Bowl-cartridge filters are mounted onto a filter head, and liquid to be cleaned passes through the filter head, into the bowl, through the replaceable filter cartridge, out of the bowl, and back into the filter head. After a period of use, the bowl-cartridge filter is removed from the filter head, and the replaceable filter cartridge is removed from the reusable bowl. The old filter cartridge is discarded and replaced with a new filter cartridge. The new filter cartridge is operably-mounted into the reusable bowl to provide a refurbished bowl-cartridge filter. This refurbished bowl-cartridge filter, containing the new filter cartridge, is then mounted onto the filter head.

In some of the existing arrangements it is possible to forget to replace the filter cartridge after removing the old filter cartridge. That is, after removing the old filter cartridge for servicing, it can be possible to replace the bowl back onto the filter head without operably inserting a new filter cartridge. This can lead to consequences for the equipment that needs the filtration.

SUMMARY

In one example implementation, a filter receptacle assembly includes a filter receptacle having a receptacle wall and a circular edge defining an opening for receiving a filter cartridge and a first interlock device coupled to the receptacle wall of the filter receptacle, wherein the first interlock device comprises a first actuator moveable between a first position and a second position and biased into the first position, wherein at least a portion of the first actuator protrudes from the receptacle wall in the first position, wherein the first interlock device is configured so that when a filter cartridge is inserted into the filter receptacle, the first actuator is moved by the filter cartridge from the first position to the second position and is held in the second position by the filter cartridge.

In another example implementation, a filter assembly includes a filter head configured to receive a filter receptacle assembly and a filter receptacle assembly configured to attach to a filter head. The filter receptacle assembly includes a filter receptacle having a receptacle wall and a circular edge defining an opening for receiving a filter cartridge, and a first interlock device coupled to the receptacle wall of the filter receptacle. The first interlock device comprises a first actuator moveable between a first position and a second position and biased into the first position, wherein at least a portion of the first actuator protrudes from the receptacle wall in the first position. The first interlock device is configured so that when a filter cartridge is inserted into the filter receptacle, the first actuator is moved by the filter cartridge from the first position to the second position and is held in the second position by the filter cartridge. The first interlock device is configured so that the first actuator in the first position interferes with installation of the filter receptacle onto the filter head.

In another example implementation, a filter receptacle assembly includes a filter receptacle having a receptacle wall and a circular edge defining an opening for receiving a filter cartridge. The filter receptacle assembly further comprises first, second and third interlock devices coupled to the receptacle wall of the filter receptacle. Each interlock device includes an actuator moveable between a first position and a second position and biased into the first position, wherein at least a portion of the actuator protrudes from the receptacle wall in the first position. Each interlock device is configured so that when a filter cartridge is inserted into the filter receptacle, the actuator is moved by the filter cartridge from the first position to the second position and is held in the second position by the filter cartridge. Each interlock device is configured so that the actuators in the first position interfere with installation of the filter receptacle onto a filter head.

BRIEF DESCRIPTION OF THE DRAWINGS

The invention may be more completely understood and appreciated in consideration of the following detailed description of various embodiments of the invention in connection with the accompanying drawings.

DETAILED DESCRIPTION

A filter receptacle assembly having an interlock device consistent with the current technology can be relevant to a variety of technological areas for implementation, and is generally configured to prevent the installation of a filter receptacle to a filter head unless a filter cartridge is properly installed therein. The interlock device is located on a receptacle wall of a filter receptacle and has a first position and a second position. In a first position, an actuator protrudes from the receptacle wall and interferes with the filter head so that the receptacle cannot be installed on the filter head. When a filter cartridge is inserted into the filter receptacle, the filter cartridge causes the actuator to be pushed into and held in a second position where it is out of the way and does not interfere with the filter head. As a result, when the actuator of the interlock device is in the second position, which indicates that a filter cartridge is present in the filter receptacle, the filter receptacle can be installed onto the filter head.

The filter assembly includes a filter head, a filter receptacle and a filter cartridge, and a fluid flow path is defined by these components. The fluid flow path passes through the filter cartridge, where filter media filters the fluid. In one example implementation, the interlock device is positioned along the flow path on an upstream side of the filter cartridge. As a result, if the interlock device breaks in any way, or comes loose, it will be caught by the filter cartridge and will not flow into the filter head. In one example implementation, the interlock device is positioned on an interior surface of the receptacle wall near a circular edge that defines an opening for receiving the filter cartridge. In the first position, the actuator of the interlock device protrudes from the interior surface. In one example implementation, the actuator extends from the interior surface at an angle of more than 90 degrees as measured from the interior surface of the filter receptacle.

In one example implementation, the actuator is the interlock device is biased into the first position by a spring. In one example implementation, the actuator is a lever. In one example implementation, the actuator is a lever that pivots about a pin.

When it is time to remove a used filter cartridge from the receptacle, the interlock device allows the used filter cartridge to translate past the interlock device. In one example implementation, an end of the actuator or lever includes a chamfer to facilitate removal of the used filter cartridge without jamming against the interlock device.

In one example implementation, the interlock device fits into a cavity formed in the receptacle wall. In one example implementation, the interlock device fits into the cavity with a press-fit. In one example implementation, a single interlock device is provided on the receptacle wall. In one example implementation, two interlock devices are provided on the receptacle wall and are separated by 180 degrees. In another example implementation, three interlock devices are provided on the receptacle wall and are separated by 120 degrees. In another example implementation, four interlock devices are provided and are separated by 90 degrees. Other numbers of interlock devices are also possible.

The interlock device as described herein can be constructed of simple components and is cost-effective, reliable and lightweight. An interlock device of this design can be simple to accommodate in most filter assemblies.

Example Implementation of the Figures

Figure 1:
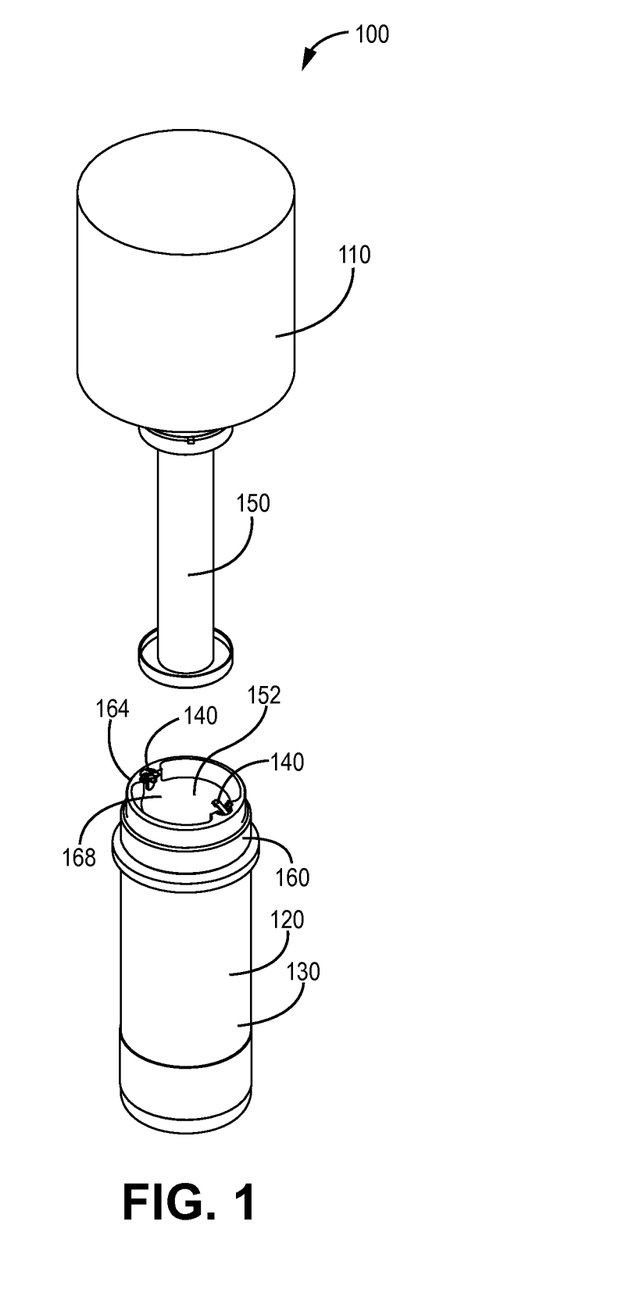
FIG. 1 depicts an exploded perspective view of a filter assembly including a filter head, a filter receptacle with interlock devices having actuators in a first position and a filter cartridge in an example implementation.

FIG. 1 depicts an exploded perspective view of a filter assembly 100 of an example implementation, which is a liquid filter application. A filter head 110 is configured to attach to a filter receptacle assembly 120. The filter receptacle assembly 120 includes a filter receptacle 130 and two interlock devices 140. In the example of FIG. 1, two interlock devices 140 are provided on the filter receptacle 130 and are separated by 180 degrees. In another example implementation, three interlock devices 140 are provided on the filter receptacle and are separated by 120 degrees. In another example implementation, four interlock devices 140 are provided and are separated by 90 degrees. Other numbers of interlock devices are also possible.

A filter cartridge 150 is shown attached to a filter head 110. In FIG. 1, the filter cartridge 150 is shown without the filter media to simplify the drawing. The filter receptacle assembly 120 defines a cavity 152 and is configured to receive the filter cartridge 150 and connect to the filter head 110. In one example implementation, the filter receptacle assembly 120 has an outer annular surface 160 that is threaded for attachment to a threaded surface of the filter head 110. The filter receptacle assembly 120 also has a circular edge 164 defining an opening 168 for receiving the filter cartridge 150.

The interlock devices 140 are configured to prevent the installation of an empty filter receptacle assembly 120 onto the filter head 110. If a filter cartridge 150 is positioned within the filter receptacle assembly 120, then the interlock devices 140 are configured to permit installation onto the filter head 110.

Figure 2:
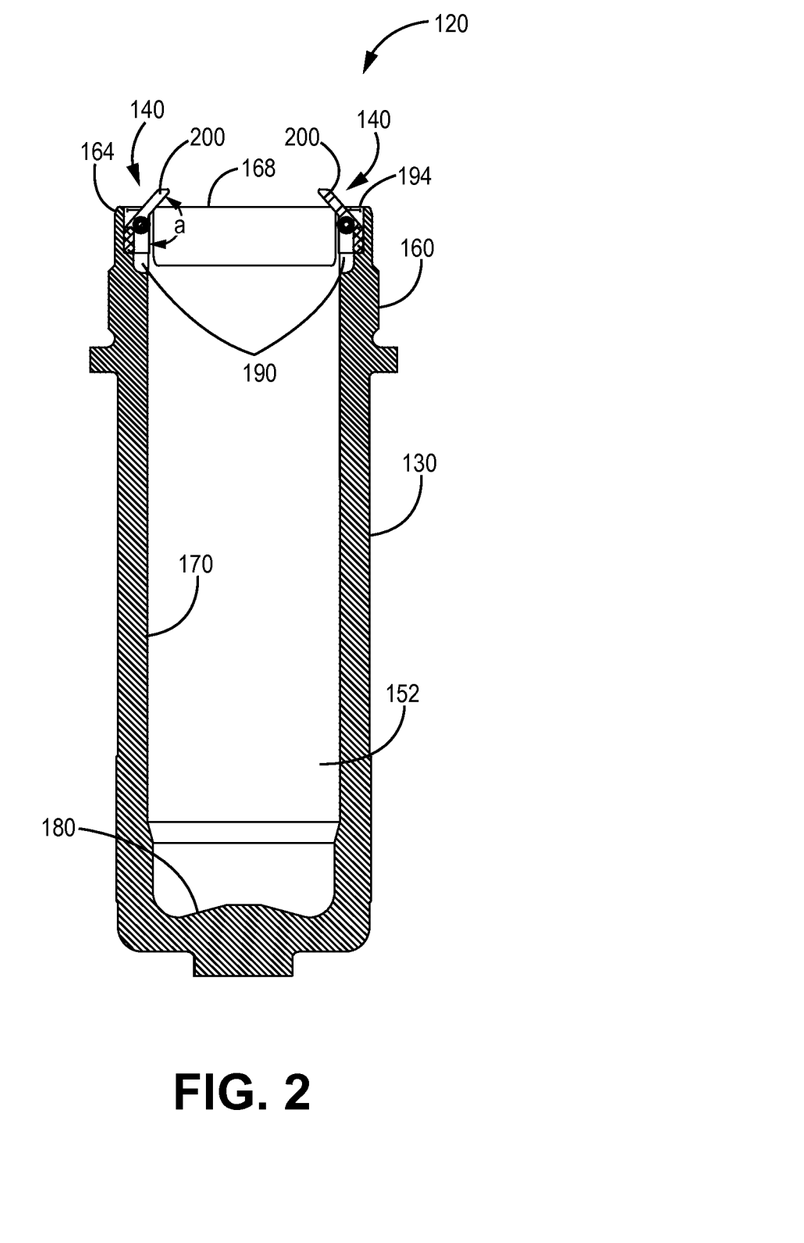
FIG. 2 depicts a cross-sectional view of the filter receptacle with interlock devices of the example implementation of FIG. 1.

FIG. 2 shows a cross-sectional view of the filter receptacle assembly 120 that includes the filter receptacle 130 and the interlock devices 140. The filter receptacle 130 includes a receptacle wall 170 and an end wall 180. The receptacle wall 170 is generally cylindrical in shape. Each interlock device 140 is positioned within a cavity 190 that is defined in the receptacle wall 170. In one example implementation, each cavity 190 is positioned near the circular edge 164 of the filter receptacle 130. In one example implementation, a top edge 194 of the cavity 190 is aligned with the circular edge 164 of the filter receptacle 130.

The interlock devices 140 are each configured to have a first position, shown in FIG. 2, in which they interfere with installation onto a filter head 110. The interlock devices 140 are biased into the first position so that they remain in the first position unless a filter cartridge 150 is inserted into the filter receptacle assembly 120. In the first position, an actuator 200 of the interlock device 140 protrudes from the receptacle wall 170 and protrudes beyond the circular edge 164 of the filter receptacle 130. In the first position, the actuator 200 protrudes from the filter receptacle 130 at an angle a as measured from the receptacle wall 170. In one example implementation, the angle a is equal to or greater than 90 degrees. In one example implementation, the angle a is equal to or greater than 130 degrees. In one example implementation, the angle a is 139 degrees.

Figure 3:
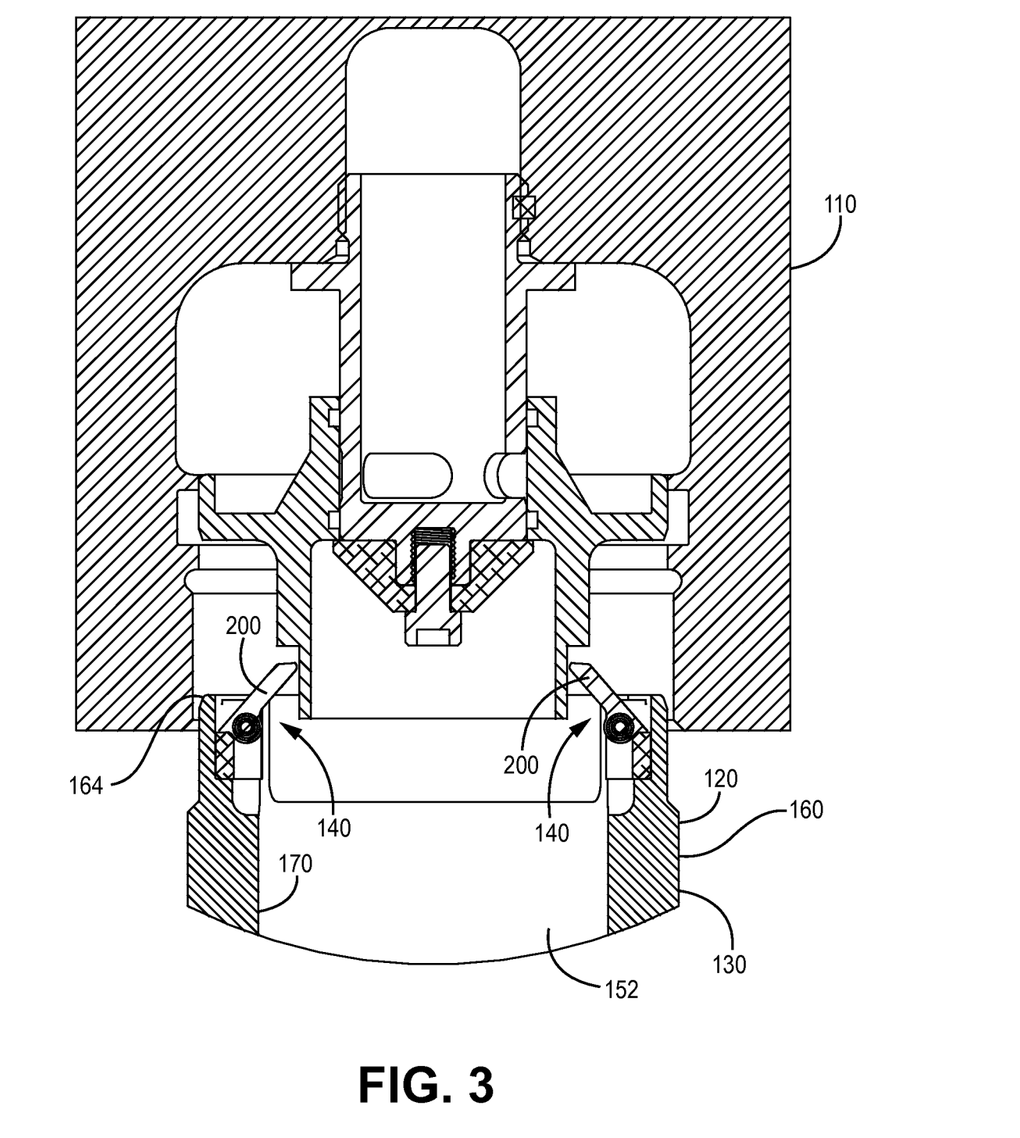
FIG. 3 depicts a cross-section view of a filter head and an empty filter receptacle having interlock devices with actuators in a first position, so that the actuators are interfering with an attempt to install the empty filter receptacle onto the filter head, according to an example implementation.

FIG. 3 depicts a cross-section view of a filter head 110 and an empty filter receptacle assembly 120 having interlock devices 140 with actuators 200 in a first position. The actuators 200 are interfering with an attempt to install the empty filter receptacle assembly 120 onto the filter head 110, according to an example implementation. Because the actuators 200 protrude above the circular edge 164 of the receptacle 130 and protrude away from the receptacle wall 170, the actuators 200 contact the filter head 110 and prevents the threaded outer annular surface 160 of the receptacle 130 from being received by the filter head 110.

Figure 4:
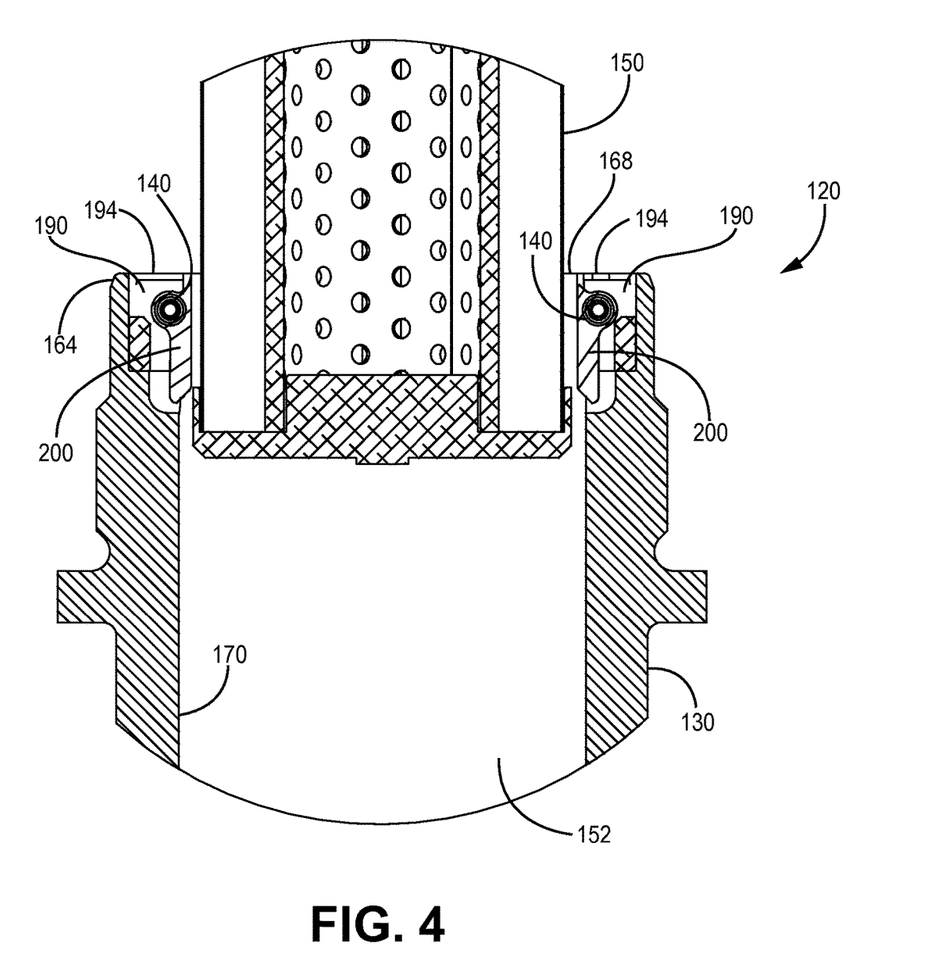
FIG. 4 depicts a cross-section view of a filter cartridge being inserted into or withdrawn from a filter receptacle, where the filter cartridge causes actuators of the interlock devices to be held into a second position, according to an example implementation.
Figure 5:
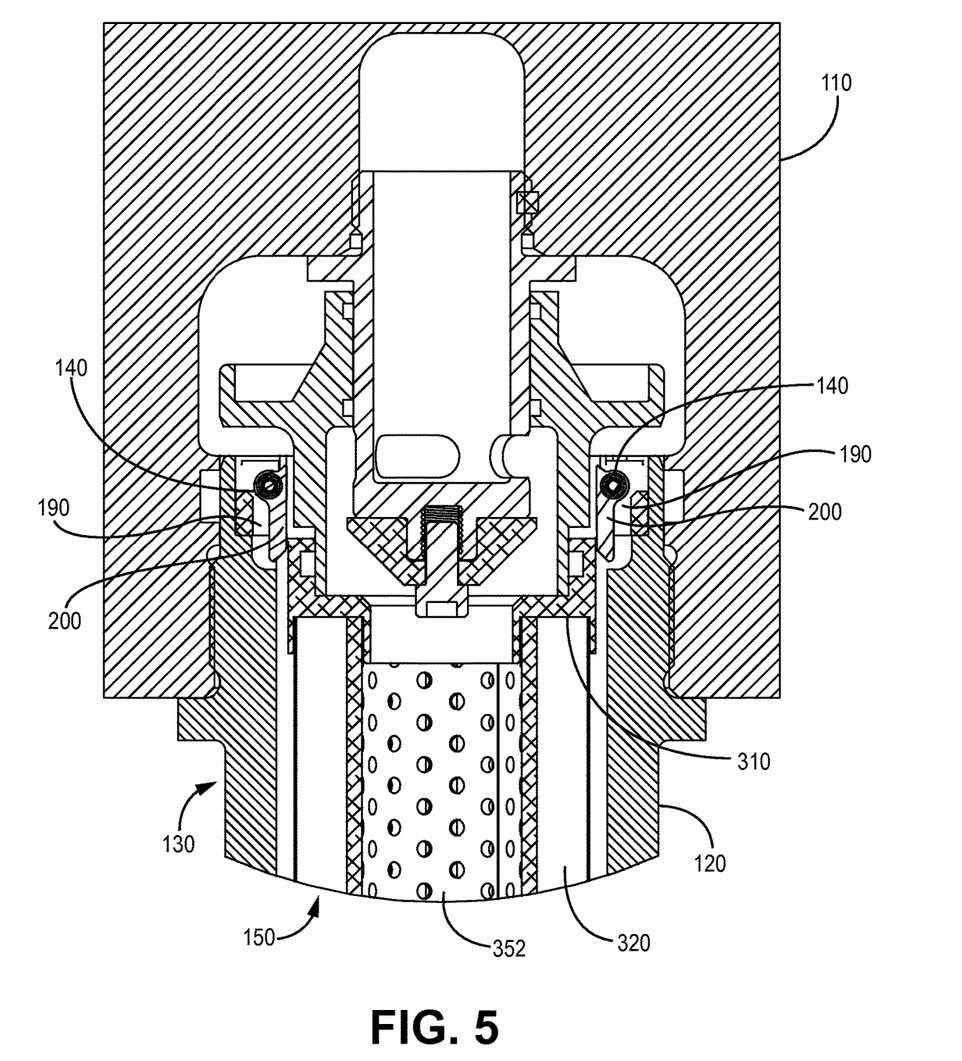
FIG. 5 depicts a cross-section view of a filter receptacle containing a filter cartridge and installed on a filter head according to an example implementation.

FIG. 4 shows a filter cartridge 150 being inserted into or removed from a filter receptacle assembly 120. When the filter cartridge 150 is inserted into the filter receptacle assembly 120, then each interlock device 140 is pushed into and held in a second position shown in FIG. 4 where it does not interfere with the installation onto a filter head 110. FIG. 5 shows a filter receptacle assembly 120 containing a filter cartridge 150 and installed on a filter head 110. The actuator 200 of each interlock device 140 is held into the second position by the filter cartridge 150. In the second position, the actuator 200 is positioned partially within the cavity 190. In the second position, the actuator 200 does not protrude above the circular edge 164 of the receptacle 130.

In one example implementation, the fluid to be filtered will pass out of the filter head 110 and into the filter receptacle assembly 120 adjacent to the receptacle wall 170. Then the fluid will flow through filter media 320 of the filter cartridge 150 and into the open filter interior 352 of the filter cartridge 150. Then the fluid will flow from the open filter interior 352 back into the filter head 110. In this arrangement, the interlock device 140 is located on a part of the flow path which is upstream from the filter cartridge 150. If a piece of the interlock device 140 were to break or come loose, it would be captured by the filter cartridge and would not flow back to the filter head 110.

Figure 6:
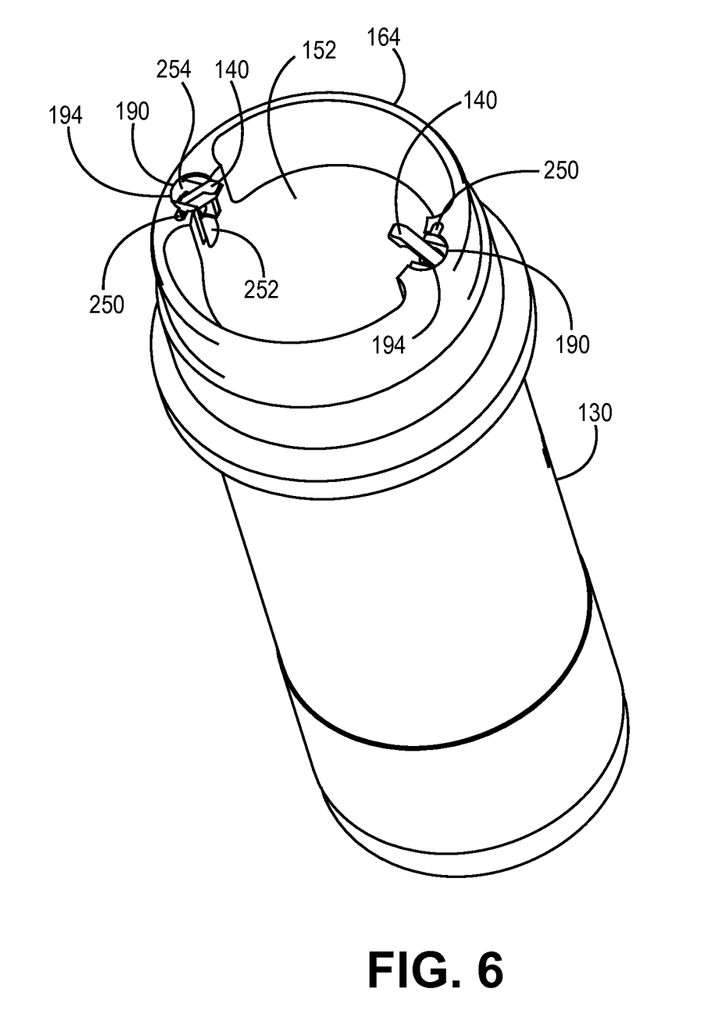
FIG. 6 depicts a perspective view of a filter receptacle having interlock devices according an example implementation.
Figure 7:
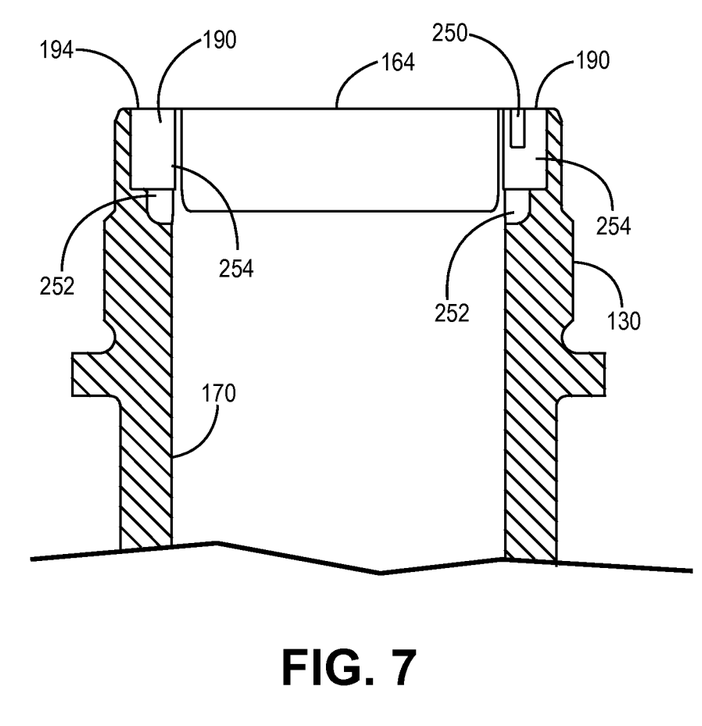
FIG. 7 shows a cross-section view of a top portion of a filter receptacle defining chambers for receiving interlock devices in an example implementation.
Figure 8:
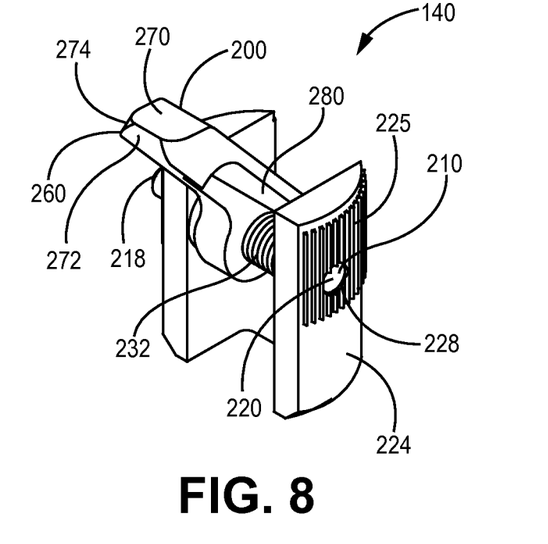
FIG. 8 shows a perspective view of an interlock device of an example implementation.
Figures 9, 10, 11, 12:
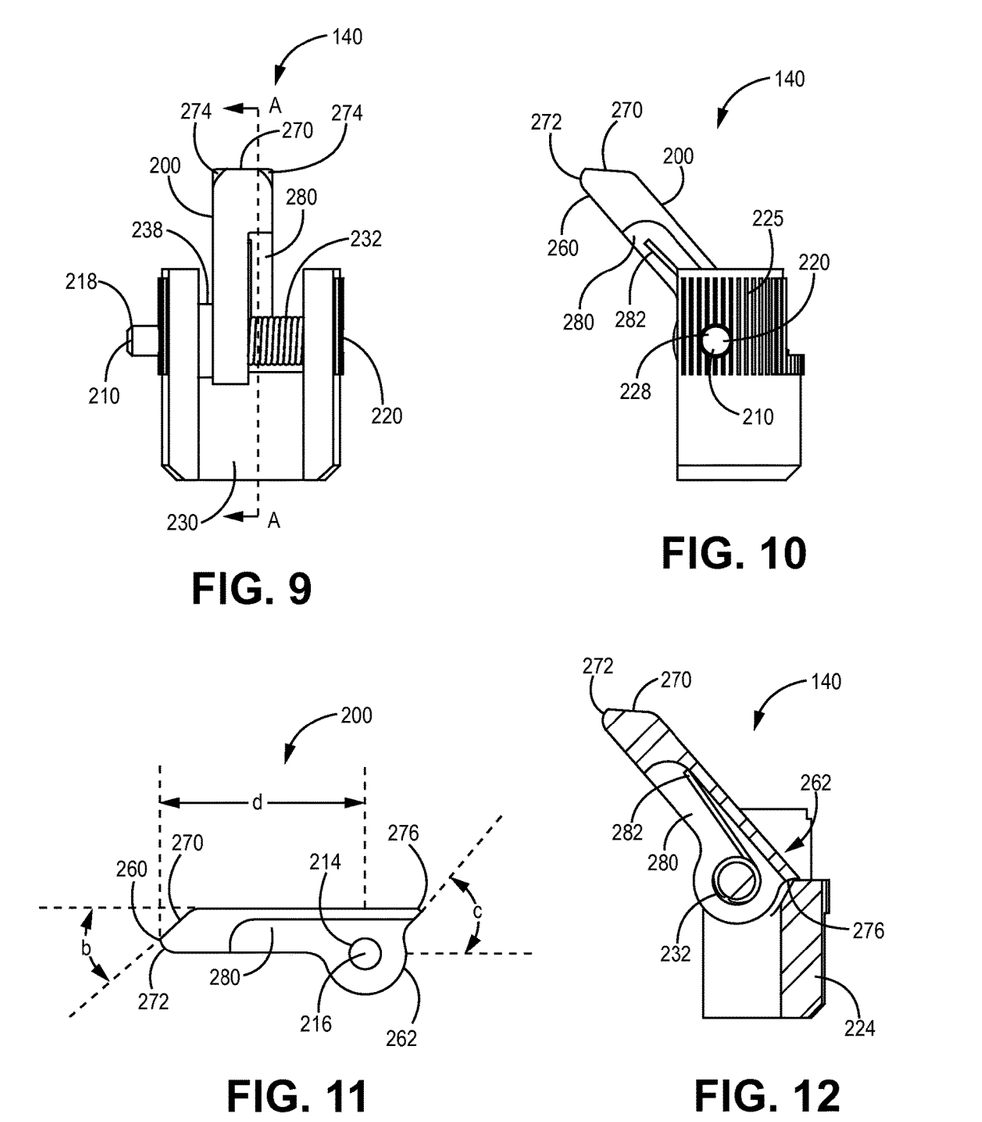
FIG. 9 shows a front view of the interlock device of the example implementation of FIG. 8.
FIG. 10 shows a side view of the interlock device of the example implementation of FIG. 8.
FIG. 11 shows a side view of an actuator of the example implementation of the interlock device of FIGS. 8-10.
FIG. 12 shows a cross-sectional view of the interlock device of FIG. 9 through section A-A.

FIG. 6 depicts a perspective top view of a filter receptacle assembly 120 having interlock devices 140 according an example implementation. The interlock devices 140 fit into cavities 190 defined in the receptacle wall 170, adjacent to the edge of the receptacle 130. FIG. 7 shows a cross-section view of a top portion of a filter receptacle 130 defining the cavities 190 for receiving interlock devices 140 in an example implementation. FIGS. 8, 9 and 10 show perspective, front and side views, respectively, of an example implementation of an interlock device 140. FIG. 11 shows a side view of an actuator 200 separate from the interlock device 140. The details of the interlock device 140 and the cavity 190 will now be described with reference to FIGS. 7-12.

In one example implementation, the interlock device 140 includes an actuator 200 which rotates about a pin 210 to move between the first and second positions. FIGS. 8-10 show the actuator 200 in a first position. The actuator 200 has a lever shape and is longer than it is wide. The actuator 200 may also be referred to as a lever. The pin 210 is cylindrical in shape and passes through an opening 214 in the actuator 200. The pin 210 has a first end 218 and a second end 220 and is retained by an interlock housing 224 of the interlock device 140. The pin 210 is received into a first housing opening (not visible in the drawings) and a second housing opening 228. As is best visible in FIG. 9, the pin 210 is positioned above an open area 230 defined by the interlock housing 224. The open area 230 will partially receive the actuator 200 when the interlock device 140 is in the second position.

The interlock device 140 also includes a spring 232 positioned around the pin 210 and a washer 238 positioned around the pin 210. The spring 232 is on one side of the actuator 200 and the washer 238 is on the opposite side of the actuator 200 from the spring 232. The spring 232 interacts with the actuator 200 so that the actuator is biased into the first position. In one example implementation, an extension portion 282 of the spring 232 is positioned within a cut-out portion 280 of the actuator to bias the actuator 200 in a first position. In this example, the spring 232 is a coil spring with the extension portion 282. Other spring types can be used in different examples. Other structures for biasing the interlock device 140 into the first position are possible. The washer 238 is configured to provide a space between the interlock housing 224 and the actuator 200 so that the actuator 200 can rotate from the first position to the second position without being hindered by the interlock housing 224.

The structure of the interlock device 140 is configured to interact with the cavity 190 of the receptacle wall 170 in order to align the interlock device 140 into its correct position, so that the actuator 200 can serve its purpose. In one example implementation, this structural interaction is provided by the first end 218 of the pin 210 interacting with a side cavity portion 250 (FIG. 7) of the cavity 190. The first end 218 of the pin 210 protrudes from the interlock housing 224, while the second end 220 of the pin 210 does not protrude from the interlock housing 224. When the interlock device 140 is positioned in the cavity 190, the first end 218 of the pin 210 slides into the side cavity portion 250. The protrusion of the pin 210 into the side cavity portion 250 prevents the interlock device 140 from rotating and holds it in the proper alignment so that the actuator 200 extends in a radial direction toward the center of the filter receptacle 130.

Now referring to FIGS. 6 and 7, the cavity 190 includes the side cavity portion 250, the lower cavity portion 252 and the main cavity portion 254. The lower cavity portion 252 receives a portion of the actuator 200 when it is in the second position, as can be seen in FIGS. 4 and 5. Returning to FIGS. 6 & 7, the main cavity portion 254 is configured to receive the interlock housing 224 in a press-fit arrangement. In one example implementation, an internal dimension of the main cavity portion 254 is equal to or very close to the dimension of the interlock housing 224, so that the interlock housing 224 fits tightly into the main cavity portion 254. Those having skill in the art will appreciate that the interlock housing 224 can be secured to the receptacle wall 170 of the filter receptacle 130 through a variety of approaches and combinations of approaches such as through adhesive or other types of bonding, using fasteners such as screws, and the like.

Aluminum or stainless steel are options for constructing the interlock device, among other metals and other material options. In one example implementation, the filter receptacle is constructed of aluminum and each interlock device is constructed of stainless steel.

Now referring to FIG. 11, the actuator 200 includes a first end 260 and a second end 262. At the first end 260, the actuator 200 defines a chamfer 270. The sloped surface of the chamfer 270 allows a spent filter cartridge 150 to be removed from the filter receptacle assembly 120 without jamming against the actuator 200. In one example implementation, the chamfer 270 has an angle b from the length of the actuator 200 as shown in FIG. 11. The angle b can be 20 to 70 degrees generally, 40 to 50 degrees in some embodiments, or 45 degrees in at least one embodiment. The first end 260 of the actuator 200 also has a curved surface 272 in one example implementation, which is further configured to ease the removal of the filter cartridge 150. The first end 260 of the actuator 200 has tapered portions 274, visible in FIGS. 8 and 9, in one example implementation, which is also configured to ease the removal of the filter cartridge 150.

The second end 262 of the actuator includes an angled tip 276 which defines an angle c with a longitudinal axis of the actuator 200 which passes through the pivot point 216, as shown in FIG. 11. The angle c is 20-70 degrees in various embodiments, 40 to 60 degrees in some embodiments, or 49 degrees in at least one embodiment. The angled tip 276 is structured so that when the actuator 140 is in the first position, such as shown in FIG. 3 and FIG. 12, the second end 262 of the actuator 140 seats against a back portion of the interlock housing 224. As a result of the angled tip resting against the back portion of the interlock housing 224, the actuator 200 will not rotate further and will stop in the first position in response to the force that is biasing the actuator 200 into the first position.

The actuator 200 defines a cut-out portion 280 on one side, as seen best in FIG. 11 and FIG. 12. The cut-out portion 280 accommodates the extension portion 282 of the spring 232 so that the actuator 200 is biased into the first position. The actuator 200 has an extension length d from its pivot point 216 to its first end 260, as shown in FIG. 11. The appropriate extension length for the actuator varies depending on the angle a at which the actuator protrudes from the receptacle wall 170, the diameter of the receptacle wall 170, and the structure of the filter head 110. The extension length d of the actuator is generally long enough to interfere with the filter head 110 when the actuator 200 is in the first position and installation of the filter receptacle assembly 120 onto the filter head 110 is attempted. In a variety of embodiments, the extension length d of the actuator 200 is sufficient to prevent engagement between the first thread of the outer annular surface 160 of the filter receptacle assembly 120 and a threaded surface of the filter head 110 when the actuator 200 is in the first position. In one example implementation the filter receptacle diameter is 1 inch to 4 inches, or 1.96 inch. In one example implementation, the extension length d is 0.25 inch to 1 inch, or 0.45 inch. In one example implementation as shown in the figures, the filter receptacle diameter is 1.96 inch, the extension length d is 0.45 inch and the angle a at which the actuator 200 protrudes from the receptacle wall 170 of the filter receptacle 130 is 139 degrees. In one example implementation, the actuator's extension length d is 15% to 40% of the filter receptacle diameter. In one example implementation, the actuator's extension length d is 20% to 25% of the filter receptacle diameter. In one example implementation, the actuator's extension length d is 23% of the filter receptacle diameter. In one example implementation, the actuator's extension length d is 23% of the filter receptacle diameter.

In one example implementation, the interlock housing 224 includes ridges 225 on its outer surface. The ridges can facilitate a press-fit installment of the interlock devices 140 into the cavities.

Filter Cartridge Configuration

Figure 13:
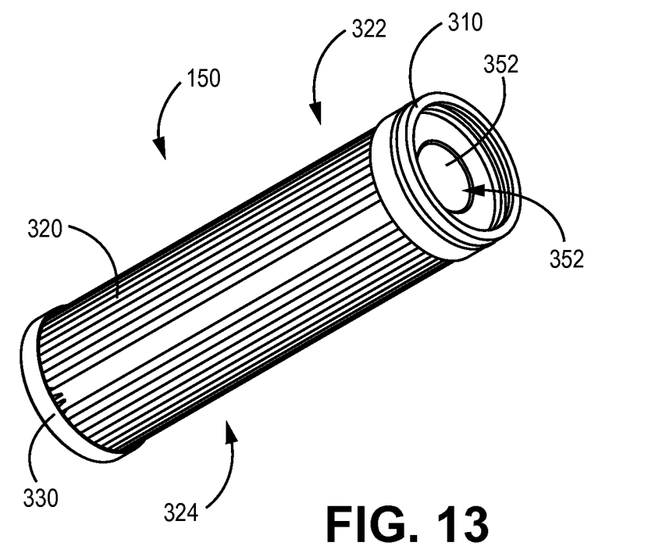
FIG. 13 shows a perspective view of a filter cartridge of an example implementation.

FIG. 13 depicts a perspective view of an example filter cartridge 150, and FIG. 5 shows a cross-sectional view of a portion of the filter cartridge 150 of FIG. 13. The filter cartridge 150 is generally tubular in shape, having a tubular construction of filter media 320 with a first media end 322 and a second media end 324. The first media end 322 is coupled to a first end cap 310 and the second media end 324 is coupled to the second end cap 330. The filter cartridge generally defines an open filter interior 352 there-through.

The filter media 320 can be virtually any type of filter media known in the art, and will generally be filter media associated with fluid filtration including air, liquids, and gases. The filter media 320 can be corrugated, non-corrugated, granular, fiberglass, paper, wire mesh, synthetic, cellulosic, fibrous, and/or combinations thereof. The filter media 320 generally has a central axis that is substantially aligned with the central axis of the filter receptacle assembly 120 (see FIG. 5, for example).

The filter cartridge 150 is configured to be installed in a filter receptacle assembly 120, such as that depicted in FIG. 1.

Method of Assembly of an Example Implementation

In one example implementation, an interlock device 140 is assembled by placing a pin 210 through the openings 228 in the interlock housing 224, the opening 214 in the actuator 200, the opening in the washer 238 and the opening in the coil spring 232. The actuator 200 is sandwiched between the washer 238 and the spring 232, and these three components are positioned in the open area 230 defined by the interlock housing 224. The pin 210 is positioned so that a first end 218 of the pin protrudes from the interlock housing 224.

Then each assembled interlock device 140 can be pressed into position within one of the cavities 190 in the filter receptacle 120. The protruding first end 218 of the pin 210 is positioned in the side cavity portion 250 of each cavity 190.

Method of Use of Example Implementation

When the filter cartridge 150 is inserted through the opening 168 of the filter receptacle assembly 120 into the cavity 152 defined therein, the filter cartridge 150 causes the interlock devices 140 to move from a first position to a second position. As a result, the interlock devices 140 do not interfere with the filter head when the filter receptacle assembly 120 is installed onto the filter head. The threads of the outer annular surface 160 of the filter receptacle assembly 120 are received by a mating structure on the filter head 110, and the filter receptacle assembly 120 is thereby installed on a filter head 110. If a filter cartridge has not been inserted into the filter receptacle assembly 120, then the interlock devices 140 will be in the first position and will prevent engagement between the threads of the outer annular surface 160 of the filter receptacle 130 and the mating structure of the filter head 110, so that it is not possible to install the filter receptacle assembly 120 onto the filter head 110.

When a filter cartridge 150 needs to be removed and replaced, the filter receptacle assembly 120 is uncoupled from the filter head 110 and the filter cartridge 150 is withdrawn from the filter receptacle assembly 120. The interlock devices 140 stay in the second position as the filter cartridge 150 is withdrawn. The chamfer 270 on the actuator first end 260 and other structures of the actuator allow the filter cartridge 150 to be withdrawn without jamming.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which the current technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A filter receptacle assembly comprising:
   (a) a filter receptacle having a receptacle wall and a circular edge, the filter receptacle defining an opening for receiving a filter cartridge; and
   (b) a first interlock device coupled to the receptacle wall of the filter receptacle, wherein the first interlock device comprises an interlock housing, a first actuator rotatable in the interlock housing between a first position and a second position and a spring that biases the first actuator in the first position, wherein at least a portion of the first actuator protrudes from the receptacle wall in the first position, wherein the first interlock device is configured so that when a filter cartridge is inserted into the filter receptacle, the first actuator is moved by the filter cartridge from the first position to the second position and is held in the second position by the filter cartridge.

2. The assembly of claim 1 wherein the first interlock device is configured so that the first actuator in the first position interferes with installation of the filter receptacle onto a filter head.

3. The assembly of claim 1 wherein the first actuator in the first position protrudes from the receptacle wall at an angle of greater than 90 degrees measured from the receptacle wall.

4. The assembly of claim 1 wherein the first actuator in the first position protrudes above the circular edge of the filter receptacle.

5. The assembly of claim 1 wherein the first interlock device is located adjacent to the circular edge of the filter receptacle.

6. The assembly of claim 1 wherein the first interlock device further comprises a pin and the first actuator rotates about the pin to move between the first position and the second position.

7. The assembly of claim 6 wherein a first end of the pin protrudes from one side of the interlock device, wherein the receptacle wall defines a first cavity that receives the first interlock device, wherein the first cavity includes a side cavity portion for receiving the first end of the pin.

8. The assembly of claim 1 wherein the receptacle wall defines a first cavity that receives the first interlock device.

9. The assembly of claim 8 wherein at least portion of the first actuator is received by the first cavity when the first actuator is in the second position.

10. The assembly of claim 1 comprising a second interlock device coupled to the receptacle wall, wherein the second interlock device comprises a second actuator moveable between a first position and a second position and biased into the first position, wherein at least a portion of the second actuator protrudes from the receptacle wall in the first position.

11. The assembly of claim 10 comprising a third interlock device coupled to the receptacle wall, wherein the third interlock device comprises a third actuator moveable between a first position and a second position and biased into the first position, wherein at least a portion of the third actuator protrudes from the receptacle wall in the first position, wherein the first, second and third actuators are spaced from each other by 120 degrees.

12. The assembly of claim 1 wherein the first actuator comprises a first end that protrudes from the receptacle wall and a chamfer at the first end.

13. A filter assembly comprising:
   a) a filter head configured to receive a filter receptacle assembly;
   b) a filter receptacle assembly configured to attach to a filter head, comprising:
      i) a filter receptacle having a receptacle wall and a circular edge, the filter receptacle defining an opening for receiving a filter cartridge; and
      ii) a first interlock device coupled to the receptacle wall of the filter receptacle, wherein the first interlock device comprises an interlock housing, a first actuator rotatable in the interlock housing between a first position and a second position and a spring that biases the first actuator in the first position, wherein at least a portion of the first actuator protrudes from the receptacle wall in the first position;
      iii) wherein the first interlock device is configured so that when a filter cartridge is inserted into the filter receptacle, the first actuator is moved by the filter cartridge from the first position to the second position and is held in the second position by the filter cartridge; and
      iv) wherein the first interlock device is configured so that the first actuator in the first position interferes with installation of the filter receptacle onto the filter head.

14. The assembly of claim 13 configured to define a fluid flow path which passes through filter media of the filter cartridge, wherein the first interlock device is positioned in a portion of the filter assembly which defines a portion of the fluid flow path which is upstream from the filter media.

15. The assembly of claim 13 wherein the first interlock device further comprises a pin and the first actuator rotates about the pin to move between the first position and the second position, wherein a first end of the pin protrudes from one side of the interlock device, wherein the receptacle wall defines a first cavity that receives the first interlock device, wherein the first cavity includes a side cavity portion for receiving the first end of the pin.

16. The assembly of claim 13 wherein the first actuator comprises a first end that protrudes from the receptacle wall and a chamfer at the first end.

17. The assembly of claim 13 wherein the first interlock device is located adjacent to the circular edge of the filter receptacle, wherein the first actuator in the first position protrudes above the circular edge of the filter receptacle.

18. A filter receptacle assembly comprising:
   a) a filter receptacle having a receptacle wall and a circular edge, the filter receptacle defining an opening for receiving a filter cartridge;
   b) a first interlock device coupled to the receptacle wall of the filter receptacle; and
   c) a second interlock device coupled to the receptacle wall of the filter receptacle,
   d) a third interlock device coupled to the receptacle wall of the filter receptacle, wherein each interlock device comprises an interlock housing, an actuator rotatable in the interlock housing between a first position and a second position and a spring that biases the actuator in the first position, wherein at least a portion of the actuator protrudes from the receptacle wall in the first position;
   e) wherein each interlock device is configured so that when a filter cartridge is inserted into the filter receptacle, the actuator is moved by the filter cartridge from the first position to the second position and is held in the second position by the filter cartridge; and f) wherein the interlock devices are configured so that the actuators in the first position interfere with installation of the filter receptacle onto a filter head.

\* \* \* \* \*

UNITED STATES PATENT AND TRADEMARK OFFICE
CERTIFICATE OF CORRECTION

PATENT NO. : 10,005,012 B2  
APPLICATION NO. : 14/296546  
DATED : June 26, 2018  
INVENTOR(S) : Sergio L. Vargas De Avila, Piyush Sharma and Bernard S. Cohen Page 1 of 1

It is certified that error appears in the above-identified patent and that said Letters Patent is hereby corrected as shown below:

On the Title Page (72) Inventors: "Piyush Sharma, Valencia, CA (US); Sergio L. Vargas De Avila, North Hills, CA (US); Bernard S. Cohen, West Hills, CA (US)" should read --Sergio L. Vargas De Avila, North Hills, CA (US); Piyush Sharma, Valencia, CA (US); Bernard S. Cohen, West Hills, CA (US)--

Signed and Sealed this  
Ninth Day of October, 2018

Andrei Iancu  
*Director of the United States Patent and Trademark Office*